G. W. HEALD.
VALVE.
APPLICATION FILED FEB. 21, 1919.
1,346,887. Patented July 20, 1920.
2 SHEETS—SHEET 2.
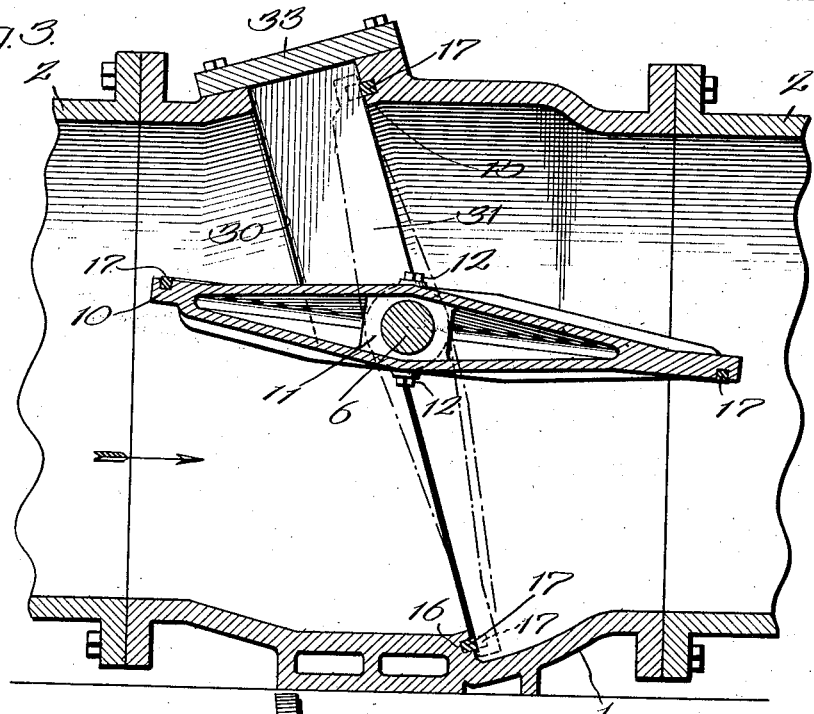
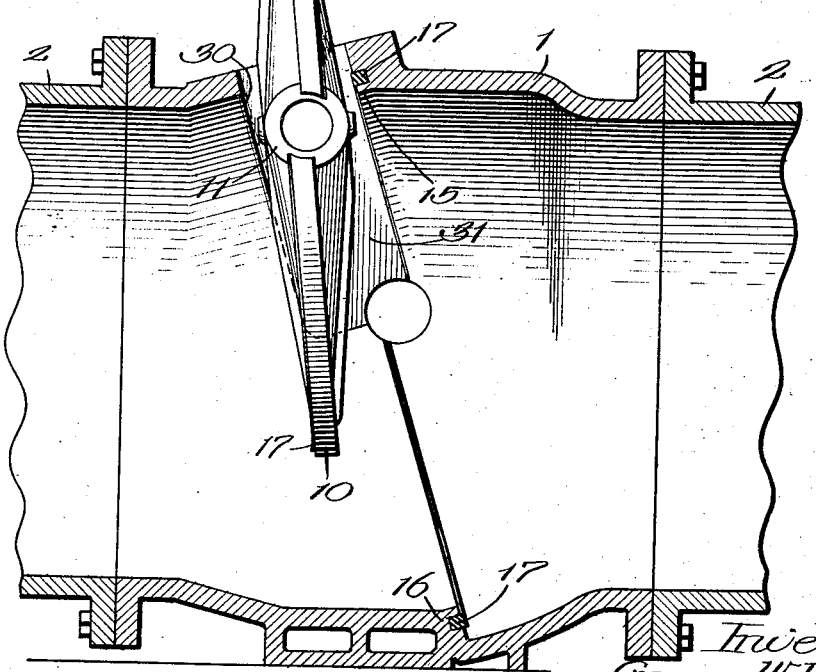

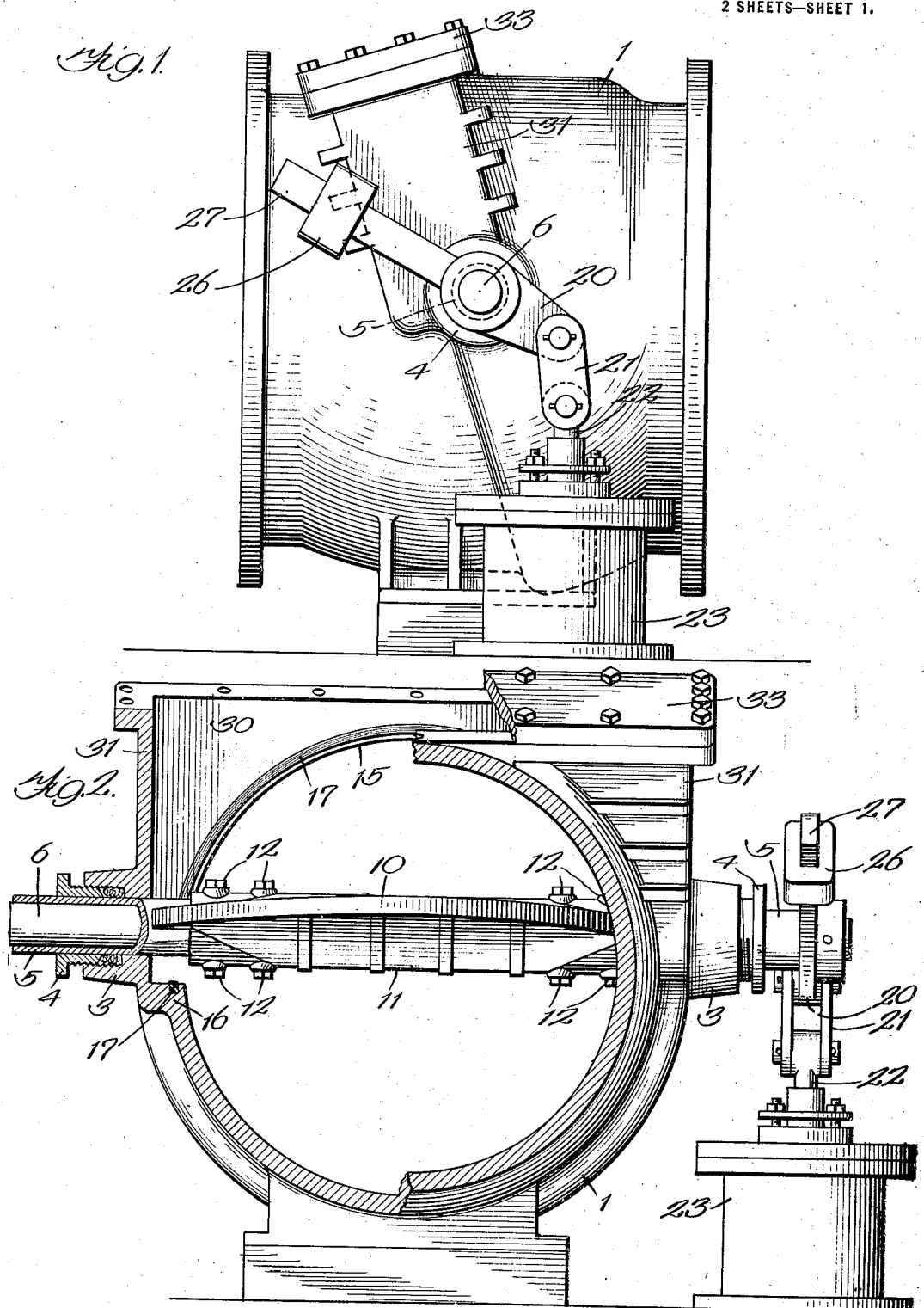

UNITED STATES PATENT OFFICE.

GEORGE W. HEALD, OF CHICAGO, ILLINOIS.

VALVE.

1,346,887.  Specification of Letters Patent.  Patented July 20, 1920.

Application filed February 21, 1919. Serial No. 278,553.

*To all whom it may concern:*

Be it known that I, GEORGE W. HEALD, a citizen of the United States, residing at Chicago, in the county of Cook and State of Illinois, have invented a certain new and useful Improvement in Valves, of which the following is a specification.

My invention relates to valves and is particularly useful in connection with the discharge pipes of large waterworks. It is important that in these discharge pipes the friction be kept as low as possible; also, that the valve act automatically to permit forward flow but effectually prevent return flow. It is also important that a construction be provided whereby the closure will be tight when the valve is closed and also that the parts be so constructed that the valve may be removed without disassembling the valve casing, or disconnecting it from the duct of which it forms a part. It is also important that the parts should be few in number and simple in form and that the valve body should be removable as a whole. I have produced a construction in which all of these desirable characteristics are combined. The invention is illustrated in the accompanying drawings, in which:

Figure 1 is a side elevation of the complete structure, showing in addition, a dash pot for preventing too rapid action of the valve.

Fig. 2 is a sectional elevation of the parts shown in Fig. 1, the plane of section being transverse to the axis of the casing, but showing the shaft, valve and dash pot in full elevation.

Fig. 3 is a sectional elevation taken lengthwise through the axis of the casing.

Fig. 4 is similar to Fig. 3, but shows the valve body in process of removal.

Similar numerals refer to similar parts throughout the several views.

In the preferred construction illustrated in the drawings, the valve casing 1 is, generally speaking, substantially cylindrical, its longitudinal axis being coincident with the longitudinal axis of the duct or passage formed in part by the adjacent pipes 2, 2. The axis of the casing is substantially horizontal. At a point slightly above the axis are bearings 3 having suitable stuffing boxes 4 and adapted to support sleeves 5 in which is journaled the main shaft 6. Mounted within the casing is a valve 10 which is approximately circular in outline and has a hub 11 which is bored to fit the shaft. Pins or keys 12 are provided for rigidly fastening the hub to the shaft. The shaft fits loosely enough so that when the set screws 60 are loosened, the shaft may be withdrawn from the casing by pulling it out lengthwise. The center of gravity of the valve body is somewhat below the axis of the shaft and consequently the valve tends to stand upright, or approximately so. The casing has two valve seats 15, 16, the seat 15 extending in approximately a half circle above the axis of the shaft, and the seat 16 extending in approximately a half circle below the axis of the shaft. The seat 15 faces the normal direction of flow, and the seat 16 faces in the opposite direction. The result is that if there is a back flow, the pressure of the water tends to hold the valve firmly to its seat. Suitable packing rings 17 are provided in the valve seat and contiguous parts of the valve, and the result is that back pressure produces a very efficient closure.

Outside of the casing an arm 20 is rigidly fastened to the shaft, and this is connected by a link 21 to the piston rod 22 of a dash pot 23. This prevents a too rapid action of the valve. As above stated, the valve is overbalanced so that its natural tendency is to stand practically upright. The amount of torque tending to close the valve by reason of its eccentrically located center of gravity may be regulated by adjusting the position of a counterweight 26 upon a rod 27, which is rigidly connected to the valve. This rod normally extends obliquely upward when the valve is closed in the manner best shown in Fig. 1.

In the best form, the casing consists of a single piece, usually of cast metal, and has a slotted housing 30 through which the valve may be lifted out of the casing. This housing stands approximately upright, parallel to the plane of the valve seats 16, 17. The valve is of substantially the full internal diameter of the casing and the hub in the housing is long enough to accommodate the valve. Consequently, the length of the hub in the housing is at least equal to the diameter of the valve and the end walls 31 of the housing rise from the point of maximum diameter of the casing. The housing is practically rectangular in horizontal cross-section, and is provided at the top with a cover 33 bolted or otherwise secured in place.

In operation, when the parts are assembled as shown, for example, in Figs. 1 to 3, the water flowing in the normal forward direction, indicated by the arrow in Fig. 3, tends to hold the valve in open position, as shown in full lines in said figure. If, for any reason, the flow ceases, gravity at once tends to rotate the valve to closed position, shown in dotted lines in Fig. 3. If there is an actual reverse flow, the water, having a greater valve area to work upon below the center of the shaft than above it, tends to close the valve tightly upon its seat with the result that leakage is effectually prevented. If, now, it is desired to remove the valve for any purpose, the cover 33 is removed, the pins or keys 12 loosened, and the shaft 6 pulled lengthwise of the casing. This releases the valve and permits it to be lifted bodily through the slotted housing 30. This avoids the need of disturbing the valve casing itself. All that is necessary is to withdraw the main shaft and remove the cover 33, whereupon the valve may be lifted bodily out of the casing.

It will be noted, especially by reference to Figs. 1, 3 and 4, that while the casing is approximately cylindrical, it has a bulge about half way between its ends where the valve is located, with the result that the cross-sectional area is greater at this point than is the area of the rest of the duct. This compensates for the obstruction necessarily introduced by the presence of the valve. In accordance with the best practice I have so proportioned the parts that the net cross-sectional area, after deducting the obstructive surface of the open valve, is substantially equal to the cross-sectional area of the casing at the ends thereof. The result is that the net effective passage is as great where the valve is located as it is in the other parts of the duct. This greatly reduces friction and other opposition to the passage of the fluid through the device.

Having thus described my invention, what I claim as new and desire to secure by Letters Patent, is:

1. In combination, a substantially cylindrical valve casing, a disk-like valve extending completely across said casing to close the passage through it, means for pivoting the valve to the casing at the point of its maximum diameter, the casing having a housing arranged in a plane transverse to the axis of the casing, the internal length of the housing being slightly greater than the diameter of the valve, whereby the valve may be withdrawn bodily from the casing without being shifted from the plane it occupies when closed, and a cover for closing the housing.

2. A valve having a substantially cylindrical valve casing, the axis whereof is adapted to extend horizontally, a disk-like valve fitting in said casing and extending substantially across the entire cross-sectional area of the casing, the casing having a housing through which the disk may be withdrawn bodily, said housing rising from the points of maximum diameter of the casing, and having a cover by which it may be closed.

3. A combined butterfly and check valve having a substantially cylindrical casing, the axis whereof is adapted to extend horizontally, said casing being formed of a single piece and provided with an integral housing rising substantially vertically from the point of maximum diameter of the valve casing, and a disk-like valve pivoted in said casing upon a horizontal axis transverse to the axis of the casing, the valve being substantially of the full diameter of the casing and being overbalanced, whereby it tends to hang approximately vertically, the casing having a valve seat adapted to be engaged by the perimeter of the valve when the latter hangs substantially vertically, the valve seat being formed in two parts, one lying below and the other above the axis of the valve disk, the part below the axis facing upstream, and the part above the axis facing downstream, whereby the flow to the casing tends to close and firmly seat the valve, the housing being open at the top whereby the valve disk may be lifted out of the casing without disturbing the latter, and the housing being provided with a removable cover.

4. A combined butterfly and check valve having a substantially cylindrical casing, a shaft extending horizontally through it approximately diametrically, said shaft being withdrawable lengthwise from the casing, a disk-like valve having a hub apertured to receive said shaft, said valve being of substantially the full diameter of the casing, and being overbalanced whereby it tends to hang approximately vertically, the casing having a valve seat formed therein adapted to permit the valve to rotate in one direction from the vertical, but prevent it from rotating in the opposite direction, the casing having a slotted housing the length of which is substantially the full diameter of the casing, whereby, when the shaft has been withdrawn longitudinally, the valve disk may be withdrawn bodily from the casing through the slotted housing.

5. In a combined butterfly and check valve, an approximately cylindrical valve casing, the ends whereof are of the normal size of the duct of which it forms a part, a disk-like valve mounted upon a horizontal axis in said casing, the axis being above the center of gravity of the valve whereby the valve tends to stand approximately vertical, a valve seat formed within the casing, the upper part of the valve seat facing upstream and the lower part facing downstream, whereby upstream flow is prevented, the casing bulging at the point where the valve seat is located, whereby the effective cross-sectional area, at this point, after deducting the effective oppositional area of the open valve, is substantially equal to the cross-sectional area at the ends of the valve casing.

6. A structure as described in claim 5 in which the casing has a slotted housing rising from the point of maximum diameter for the bodily withdrawal of the valve, the slot of said housing being adjacent to and on the upstream side of the upper part of the valve seat.

In witness whereof, I have hereunto subscribed my name.

GEORGE W. HEALD.